(No Model.)

F. W. EVANS.

SPINDLE FOR TURNING LATHES.

No. 268,393. Patented Dec. 5, 1882.

Attest
Thos. D. Lockwood,
C. H. M. Hazel.

Inventor.
Frank W. Evans
by his attorney
Geo. Willis Pierce.

UNITED STATES PATENT OFFICE.

FRANK W. EVANS, OF NEWBURYPORT, MASSACHUSETTS.

SPINDLE FOR TURNING-LATHES.

SPECIFICATION forming part of Letters Patent No. 268,393, dated December 5, 1882.

Application filed July 24, 1882. (No model.)

*To all whom it may concern:*

Be it known that I, FRANK W. EVANS, of Newburyport, in the county of Essex and State of Massachusetts, have invented certain Improvements in Turning-Lathes, of which the following is a specification.

This invention relates to turning-lathes, and has for its object to provide improved devices whereby objects greatly varying in size and weight can be secured to the same center-screw of the lathe-spindle and be turned.

In the ordinary turning-lathe the center-screw may be removed and another substituted therefor when the nature of the work demands a different length of screw; or the center-screw can be shortened by introducing upon its upper end pieces of wood of sufficient thickness to leave the point of the screw to project the required amount, this latter being the usual expedient, all of which acts as a hinderance, necessitating loss of time and annoyance.

My invention has for its specific object to provide a center-screw for the spindle of a turning-lathe capable of being adjusted in such a manner that a longer or shorter screw may be made to project from the face-plate of the lathe, according to the nature of the work to be performed, all of which I will now proceed to describe and claim.

Figure 1:
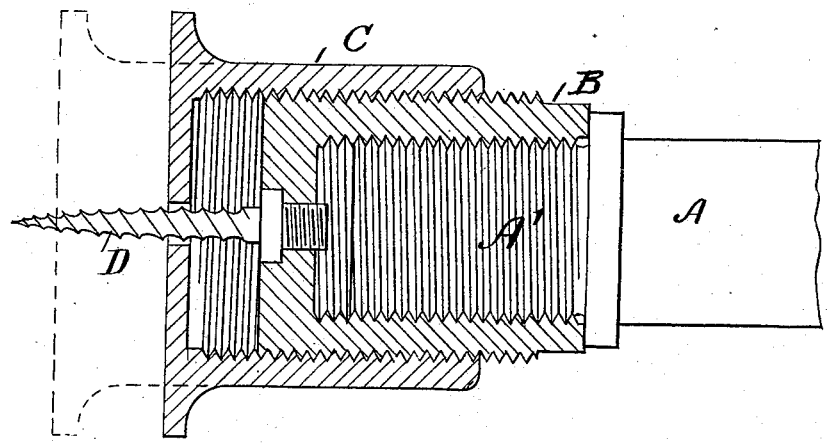
Figure 2:
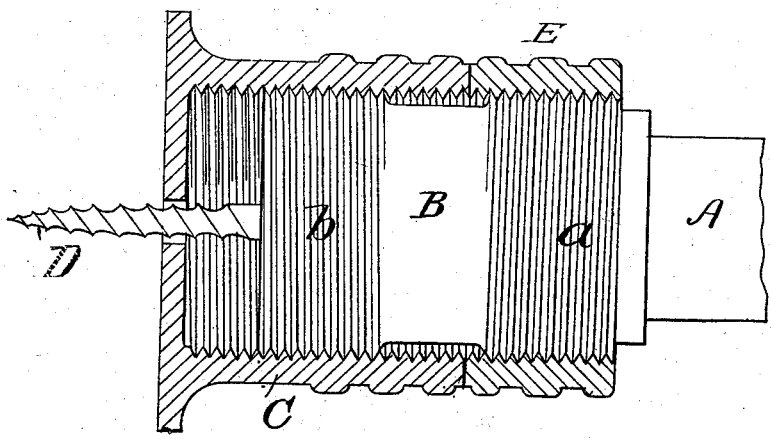

Of the accompanying drawings, forming a part of this specification, Figure 1 shows an embodiment of my invention. Fig. 2 shows the same, with the addition of a set or jam nut for additional security in case such should be needed in holding the parts to their work.

In the drawings, A is the lathe-spindle, upon the outer end of which is a screw, A'.

B is an internally right and externally left threaded sleeve or nut, having its outer end closed. This sleeve is made to screw upon the end of the spindle. Into the closed end of the sleeve B is screwed the center-screw D.

C is a face-plate, internally left-threaded to screw upon the shell B, having an opening in its end for the center-screw to pass through. The center-screw D might be secured directly to the end of the lathe-spindle; but I prefer the means shown and described. The length of the screw projecting beyond the face-plate C is graduated by moving the face plate onto or off from the sleeve B.

When it is desired to turn a large block and a large screw is wanted the face-plate is moved to the position shown in full lines in the drawings, thus causing a large portion of the screw D to project from the face-plate C.

When a very small object is to be turned the face-plate is moved outwardly to a position as shown in dotted lines in Fig. 1, when a small portion of the screw D will project from the face-plate.

When such work as steam and gas fittings, valve parts, finishing nuts, &c., is to be done, a center-screw is used of a standard diameter, and the length required is graduated by the means shown.

The chuck may be attached to the lathe by fitting the spindle-screw as shown in Fig. 1, or by means of a taper shank made to fit a taper hole in the spindle, or by any of the well-known ways.

It will be seen readily that by means of my improvement blocks to be turned can be as easily secured to the center-screw as by the ordinary lathe, and that great convenience is secured by the rapidity with which the screw can be adjusted to meet the demands of the varying character of the work to be performed on a turning-lathe, there being no substitution of screws to meet the exigencies constantly arising. I do not confine myself to the precise forms shown, as they may be varied without departing from the spirit of my invention. Ordinarily the form shown in Fig. 1 would perform all that is required, the work being turned upon the screw D until it brings up against the face-plate C; but in case a very heavy block was to be worked it might be desirable to more firmly secure the face-plate. To provide for this I make the sleeve B, as shown in Fig. 2, with a right-hand screw upon its outer end, $b$, as in Fig. 1, and in addition a left-hand screw upon its inner end, $a$, and upon the end $a$, I place a set or jam nut, E, to be screwed firmly against the end of the face-plate, as shown. The threads, being diverse in direction, prevent either the face-place or the nut from moving.

Having described my invention, what I claim is—

1. In a turning-lathe, and in combination with the spindle thereof, a center-screw rigidly attached to the said spindle, and an adjusting face-plate centrally perforated for the passage of the center-screw and adapted to screw onto the lathe-spindle or its equivalent and over the central screw, whereby the length of the central screw projecting from the face-plate may be graduated, substantially as described.

2. The combination, in a turning-lathe, of the center-screw D, rigidly attached, either directly or by means of an intermediate sleeve, B, to the lathe-spindle A, but capable of detachment therefrom, with the adjusting centrally-perforated face-plate C, surrounding the said center-screw, and adjustably attached by means of an internal thread to the lathe-spindle A or to the screw-holding sleeve B, substantially as hereinbefore described, and for the purpose set forth.

3. In a turning-lathe, the combination, substantially as hereinbefore set forth, of a center-screw, a holder therefor, consisting of a sleeve adapted by means of an internal screw-thread for rigid attachment to the lathe-spindle, and having also a screw-thread on its external surface, and an adjusting or adjustable face-plate having a hole at its center for the passage of the center-screw, and furnished with an internal thread, whereby it may be screwed to any required extent upon the holder, thus graduating the external length of the center-screw.

4. The combination, in a turning-lathe substantially as hereinbefore described, of the center-screw D and screw-holding sleeve B, rigidly attached to the lathe-spindle, the centrally-perforated face-plate C, threaded for adjustable attachment to the screw-holding sleeve, and adapted to turn thereon and move over the center-screw and to graduate its external length, and the jam or set nut E, also fitting the screw-holding sleeve and provided with an internal thread of opposite direction to that of the face-plate, whereby it is caused to move oppositely thereto, for the purpose set forth.

In testimony whereof I have signed my name to this specification, in the presence of two subscribing witnesses, this 11th day of July, 1882.

FRANK W. EVANS.

Witnesses:
WILLIAM H. JOHNSON,
WILLIAM H. T. DODGE.